United States Patent [19]

Tsujimoto

[11] Patent Number: 5,185,813
[45] Date of Patent: Feb. 9, 1993

[54] DOCUMENT IMAGE PROCESSING APPARATUS

[75] Inventor: Shuichi Tsujimoto, Kanagawa, Japan

[73] Assignee: Kabushiki Kaisha Toshiba, Kawasaki, Japan

[21] Appl. No.: 823,608

[22] Filed: Jan. 17, 1992

Related U.S. Application Data

[63] Continuation of Ser. No. 298,986, Jan. 19, 1989, abandoned.

[30] Foreign Application Priority Data

Jan. 19, 1988 [JP] Japan .................................. 63-7518

[51] Int. Cl.$^5$ ............................................. G06K 9/00
[52] U.S. Cl. ........................................ 382/9; 382/37; 382/61
[58] Field of Search ............... 382/9, 37, 61; 364/518, 364/521; 395/145, 148

[56] References Cited

U.S. PATENT DOCUMENTS 4,751,740  7/1988  Wright ................................... 382/61
4,862,392  8/1989  Steiner .................................. 364/518

OTHER PUBLICATIONS

8th ICPR, Junichi Higashino, Hiromichi Fujisawa, pp. 745-748, Yasuaki Nakano and Masadrazu Ejiri, Oct. 27-31, 1986.

Proceedings Of The 1987 IEEE Int'l Conference On Systems, Man & Cybernetics, vol. 2, Oct. 20, 1987, New York, US, pp. 759-763, O. Iwaki, et al., "A Segmentation Method Based on Office Document Hierarchical Structure".

8th Int'l Conference On Pattern Recognition, Oct. 27, 1986, New York, US, pp. 769-772; Y. Maeda, et al, "Character Segmentation in Japanese Hand-Witten Document Images".

9th Int'l Conference on Pattern Recognition, Nov. 14, 1988, New York, US, pp. 739-743; G. Ciardiello, et al, "An Experimental System for Office Document Handling and Text Recognition".

Primary Examiner—Leo H. Boudreau
Attorney, Agent, or Firm—Oblon, Spivak, McClelland, Maier & Neustadt

[57] ABSTRACT

A document image processing apparatus is provided, which comprises a structure analyzing unit for analytically dividing an input document image into sub-blocks having a specified physical positional relationship to each other, a structure forming unit for forming a representation form corresponding to the physical positional relationship between the sub-blocks obtained by the structure analyzing unit, and a structure understanding unit for transforming the representation form obtained by the structure forming unit into a modified document image having a predetermined relationship between the sub-blocks.

6 Claims, 7 Drawing Sheets (H: HEAD, B: BODY)

(T: TITLE, N: NAME,
S: SUB-TITLE, A: ABSTRACT,
P: PARAGRAPH)

(H: HEAD, B: BODY)

DOCUMENT IMAGE PROCESSING APPARATUS

This application is a continuation of application Ser. No. 07/298,986, filed on Jan. 19, 1989, now abandoned.

BACKGROUND OF THE INVENTION

1. Field of the Invention

This invention relates to a document image processing apparatus, and more particularly to a document image processing apparatus that can properly read a document image which includes a large number of articles and columns.

2. Description of the Prior Art

A conventional document image processing apparatus cannot automatically read a document including a large number of articles and columns. Such an apparatus only can read in order from top to bottom read a document having a single article of a single column.

Therefore, when a document including a large number of articles and columns is required to be read by the conventional apparatus, the input document image must be divided into subregions represented by lines of text or paragraphs of lines. Further, the relationship of connections between the respective sub-blocks must be designated by human operations.

Moreover, each document to be read must be defined individually in terms of its own layout form. Thus, a document including a large number of articles and columns must be read by procedures associated with cumbersome and time-consuming human intervention.

SUMMARY OF THE INVENTION

Accordingly, one object of the present invention is to provide a document image processing apparatus capable of automatically processing input document images without the need for additional human intervention.

Briefly, in accordance with one aspect of this invention, there is provided a document image processing apparatus which comprises a structure analyzing unit for analytically dividing an input document image into sub-blocks having a specified physical positional relationship to each other, a structure forming unit for forming a representation form corresponding to the physical positional relationship between the sub-blocks obtained by the structure analyzing unit, and a structure understanding unit for transforming the representation form obtained by the structure forming unit into a modified document image having a predetermined relationship between the sub-blocks.

BRIEF DESCRIPTION OF THE DRAWINGS

A more complete appreciation of the invention and many of the attendant advantages therof will be readily obtained as the same becomes better understood by reference to the following detailed description when considered in connection with the accompanying drawings, wherein:

FIG. 2a is a diagram illustrating the operation of a structure analyzing unit and FIG. 2b is a diagram illustrating the operation of a geometric structure forming unit;

FIG. 4a is a diagram illustrating the operation of the structure analyzing unit utilizing different designations for the sub-blocks and FIG. 4b is a diagram illustrating the operation of a structure understanding unit;

FIG. 10a is a diagram illustrating the operations of the structure analyzing unit and FIG. 10b is a diagram illustrating the operations of the geometric structure forming unit and the structure understanding unit.

DESCRIPTION OF THE PREFERRED EMBODIMENTS

Figure 1:
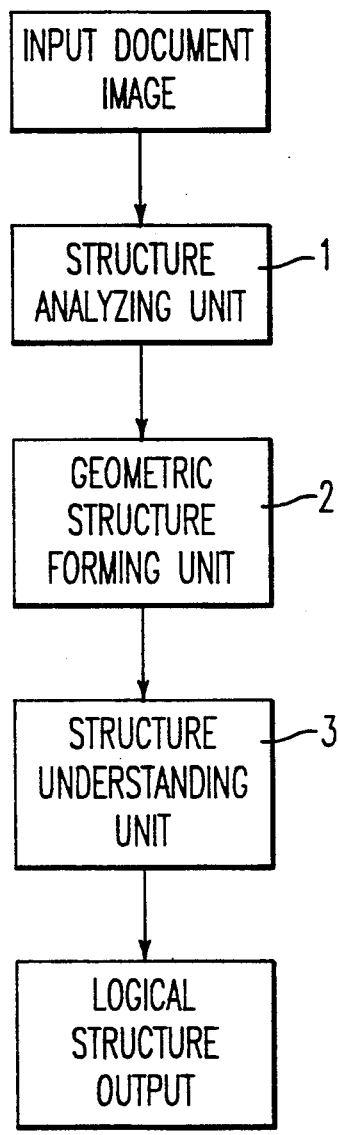
FIG. 1 is a block diagram illustrating one embodiment according to the present invention.
Figure 2A:
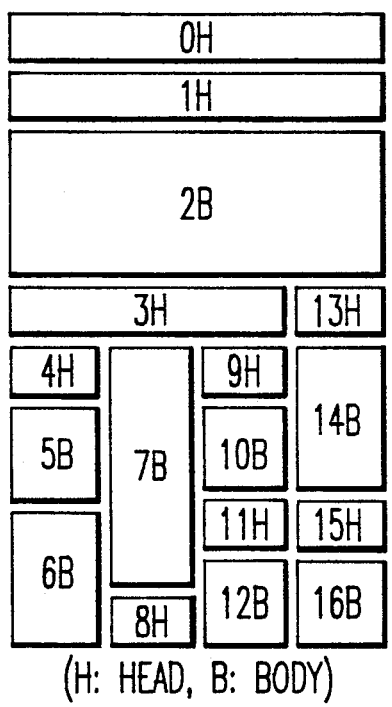
FIGS. 2a and 2b are diagrams illustrating the operations of one embodiment according to the present invention.

Referring now to the drawings, wherein like reference numerals designate identical or corresponding parts throughout the several views, and more particularly to FIG. 1 thereof, one embodiment of this invention will be described. In FIG. 1, input document images are fed into a structure analyzing unit 1. In the structure analyzing unit 1, the input document images are analytically divided into sub-blocks having analogous physical properties (such as character size and pitch, spacing, font type, and underlining). Here, the sub-blocks are classified into two items such as "head" and "body" in accordance with their physical properties. The term "head" (H) is given to a sub-block that has only a few text lines. The term "body" (B) is given to a sub-block other than a "head" (H) sub-block, as shown in FIG. 2a. Further, the numerals attached to H or B of the sub-blocks in FIG. 2a indicate the proper reading order.

Next, the positional relationship between the sub-blocks is represented by use of a tree diagram (hereinafter, simply referred to as a tree) in a geometric structure forming unit 2. The thus formed positional relationship is defined as a geometric structure. (FIG. 2b).

Figure 2B:
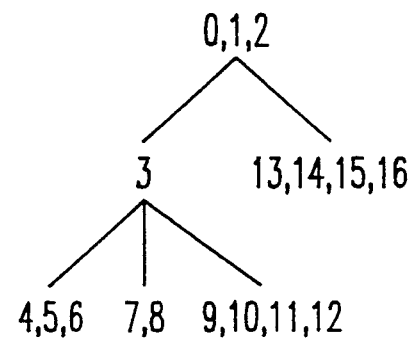

As seen from FIG. 2b, the respective nodes of the tree have single or plural numerals in sequence. This group of numerals is defined as a list. The numerals of the lists represent the positional relationship of the sub-blocks in FIG. 2a. The order of the numerals coincides with the proper human reading order.

Specifically, the uppermost node of the tree of FIG. 2b has a list including numerals such as 0, 1 and 2. These correspond to the sub-blocks 0H, 1H and 2B respectively positioned in the same column at the upper portion of FIG. 2a. Further, in FIG. 2a, the sub-blocks 3H and 13H are positioned under the sub-block 2B. Three columns are present under the sub-block 3H. Each column includes sub-blocks such as 4H, 5B and 6B, and 7B and 8H, and 9H, 10B, 11H and 12B.

Next only one column including sub-blocks 14B, 15H and 16B is positioned under the sub-block 13H. Therefore, in FIG. 2b, the left node at the intermediate portion of the tree has a list including the numeral 3, which represents 3 of the sub-block 3H in FIG. 2a. The right node has a list including the numerals 13, 14, 15 and 16 which respectively represent sub-blocks 13H, 14B, 15H and 16B in FIG. 2a. Similarly, three nodes which are situated under the node having the list that includes 3, have the lists including numerals 4, 5 and 6, 7 and 8, and 9, 10, 11 and 12 which respectively represent sub-blocks 4H, 5B and 6B, of the sub-blocks 7B and 8H, sub-blocks 9H, 10B, 11H and 12B in FIG. 2a.

Next, in the structure understanding unit 3 of FIG. 1, a logical structure is produced on the basis of the above-described geometric structure. The logical structure corresponds to a modified document image having a predetermined relationship between the sub-blocks.

Next, the embodiment of FIG. 1 will be described in more detail with reference to FIG. 3. The structure analyzing unit 1 of FIG. 1 comprises a run length coding unit 23, a column information extracting unit 24, a line information extracting unit 25, a sub-block information extracting unit 26, and an item adding unit 27. Further, the geometric structure forming unit 2 of FIG. 1 comprises an adjacent information-in-identical column extracting unit 28, and a tree structure forming unit 29. The structure understanding unit 3 of FIG. 1 comprises a transformation unit 30, a multiple texts processing unit 31, and an item adding unit 32.

Figure 3:
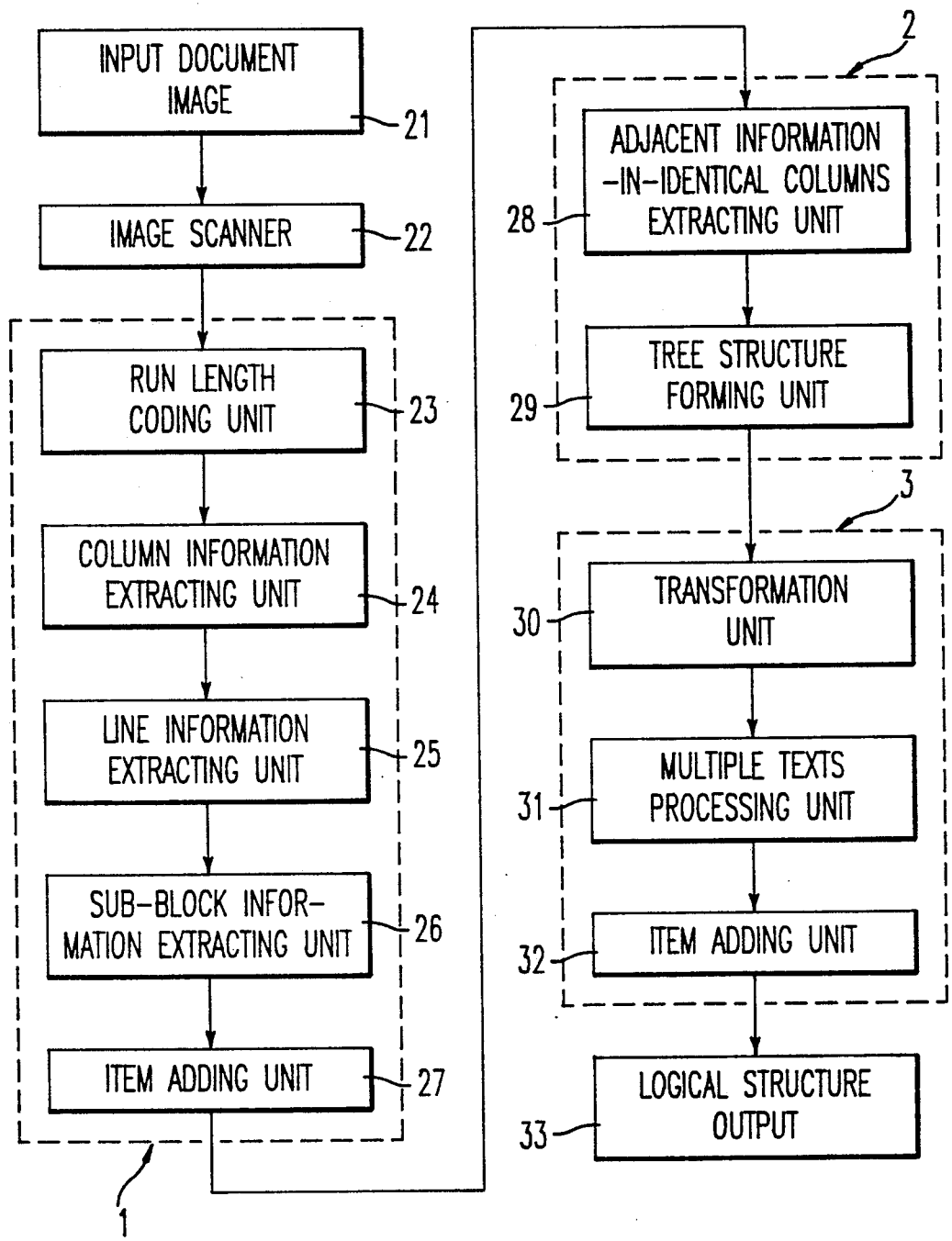
FIG. 3 is a detail block diagram illustrating one embodiment according to the present invention.

In FIG. 3, input document images 21 are optically read by an imge scanner 22. Output signals produced from the image scanner 22 are fed into the run length coding unit 23. In the unit 23, run length code signals are formed on the basis of the thus input document image signals. Next, the run length code signals are processed in prescribed manners by means of the column information extracting unit 24, the line information extracting unit 25, and the sub-block information extracting unit 26. As a result, the input document images are divided into sub-block information corresponding to the respective sub-blocks of the input document images in terms of physical properties. The thus obtained sub-block information is designated corresponding to items of the input document images by means of the item adding unit 27.

Thereafter, output signals produced from the item adding unit 27 are fed into the adjacent information-in-identical column extracting unit 28. In the unit 28, sub-blocks adjacent to each other in the same column are extracted as adjacent information. The adjacent information produced from the unit 28 is fed into the tree structure forming unit 29. In the unit 29, trees of geometric structure having nodes including the thus received adjacent information are formed.

Subsequently, output signals produced from the unit 29 are fed into the transformation unit 30. In the unit 30, the trees of geometric structure are transformed into trees of logical structure by use of various rules of extracting priority order information. Thereafter, output signals produced from the unit 30 are fed into the multiple texts processing unit 31. In the unit 31, a large number of texts are processed in accordance with the prescribed manner. Finally, output signals produced from the unit 31 are fed into the item-adding unit 32. In the unit 32, corresponding items are respectively added to the thus obtained sub-blocks. As a result, logical structure outputs 33 are produced from the unit 2.

Here, the description will be made as to the logical structure. In accordance with the contents of a document, the sub-blocks can be classified into bibliographic items such as title, subtitle, abstract, etc, and main text items, such as paragraphs. The priority relationship of the sub-blocks is represented logically by use of a tree.

The respective nodes of the tree have lists including the numerals of sub-blocks having the same priority. The order of the numerals in the respective lists coincides with the priority order of proper reading. Further, the size of the tree corresponds to the number of different priority relationships present among the sub-blocks of the document image.

Figure 4A:
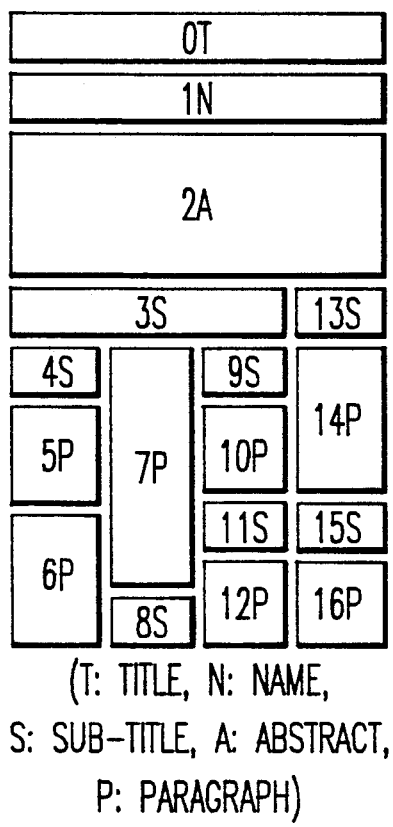
FIGS. 4a and 4b are diagrams illustrating the operation of one embodiment according to the present invention.
Figure 4B:
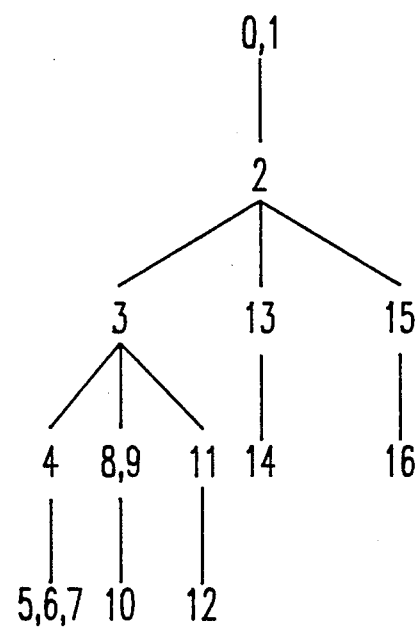

Specifically, FIG. 4a shows a geometric structure. In FIG. 4a, T represents a title, N represents an author's name, S represents a subtitle, A represents an abstract, and P represents a text paragraph. Further, the numerals of the respective sub-blocks indicate the logical order of the document from top to bottom, i.e., in proper human reading order. The geometric structure of FIG. 4a is transformed into a logical structure in the form of a tree, as shown in FIG. 4b. The uppermost node of the tree of FIG. 4b has a list including the numerals 0 and 1. These represent the title and author's name which are on the same level in terms of priority. The order of the numerals 0 and 1 correspond to the proper reading order. The node situated immediately under the uppermost node has a list including the numeral 2. This represents the sub-block 2A which is an abstract. The next three nodes have lists each including one of the numerals 3, 13 and 15. These correspond to the sub-blocks 3S, 13S and 15S which are the subtitles on the same level. The three nodes under the number 3 each has a list including the numerals 4, 8 and 9, and 11 respectively. These correspond to the sub-blocks 4S, 8S, 9S and 11S, each of which is a subtitle and is dominated by the subtitle 3S. There is no paragraph between the subtitles 8S and 9S. Thus, the corresponding numerals 8 and 9 appear at the same node. The paragraphs 5, 6 and 7 are dominated by the subtitle 4S.

Thus, in the tree of FIG. 4b, the numerals 5, 6 and 7 are situated together under the number 4. Similarly, the paragraph 10 is dominated by the subtitle 9S. Thus, the numeral 10 is situated under the node having the list including the numerals 8 and 9. The paragraph 12 is dominated by the subtitle 11, so that the numeral 12 is situated under the node having the list including the numeral 11. The paragraph 16p is dominated by the subtitle 15S, so that the numeral 16 is situated under the node having the list including the numeral 15.

Next, the transformation examples in the structure understanding unit 3 will be described with reference to FIG. 5 through FIG. 8. A logical structure can be obtained by transforming a geometric structure in accordance with the following four rules a through d. In FIG. 5 through FIG. 8, S represents a sub-block, H represents a head sub-block, and B represents a body sub-block.

Figure 5:
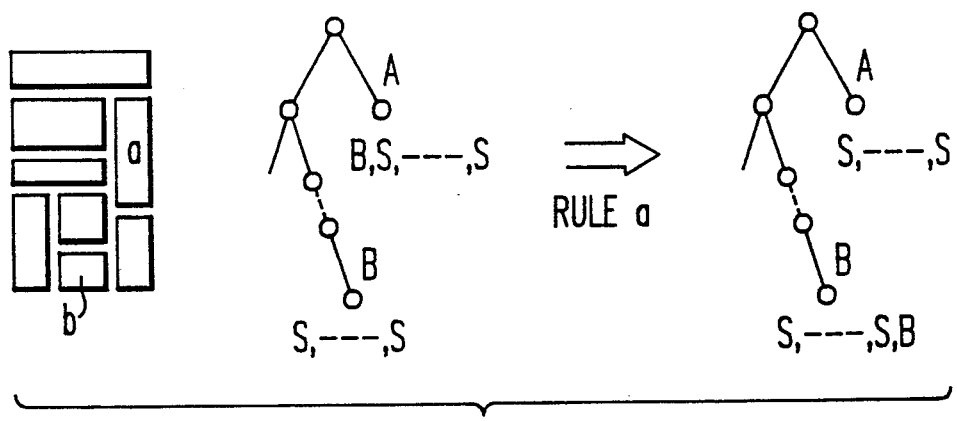
FIGS. 5 to 8 are diagrams respectively illustrating the operation of the structure understanding unit for different document image arrangements and different representation forms.

Rule a (refer to FIG. 5)

If a node (A) is a terminal node, the first element of node (A) is a body, and the precedent node (B) to node (A) in the order index is also a terminal node, then remove the first element from node (A) and append it to last element of node (B). FIG. 5 illustrates the transformation process using this rule. This rule is based on the observation that a title should have a single set of paragraphs as a (a parent, child or daughter relationship is established between upper levels and lower levels of the material) daughter in the logical structure. Eldest or younger presume the normal relationship of eldest being earlier in time and younger being later in time (i.e., further down the page). Therefore, if the parent of a terminal node containing bodies has several daughters, then only one of them can be the true daughter of the parent. It is reasonable that the eldest daughter represents the text dominated by the parent and that others should be merged to her.

Figure 6:
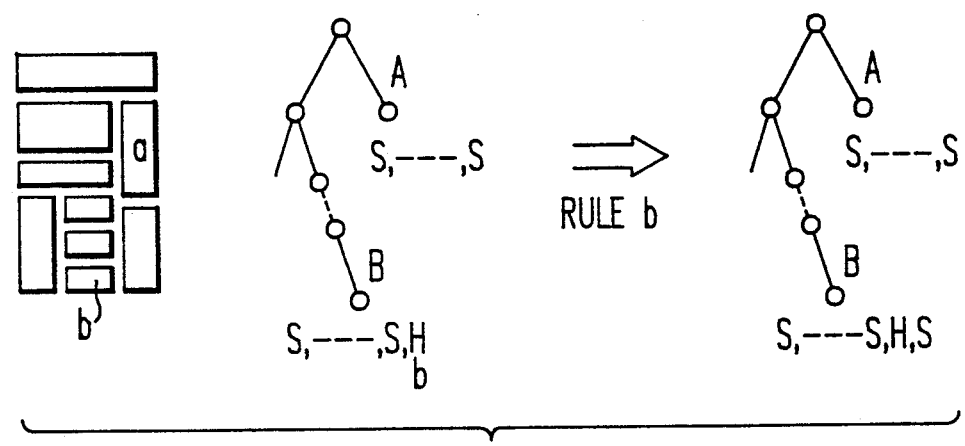

Rule b (refer to FIG. 6)

If a node (A) is a terminal node that is not connected to the root node, the precedent node (B) to node (A) in the order index is also a terminal node, the first element of node (A) is not NULL, and the last element of node (B) is a head, then the first element from node (A) is removed and is appended to the last element which is present on node (B). FIG. 6 illustrates this rule. Here, element (A) is removed and appended to node (B). The difference is that the first element of node (A) does not need to be a body, if the last element of node (B) is a head block.

Figure 7:
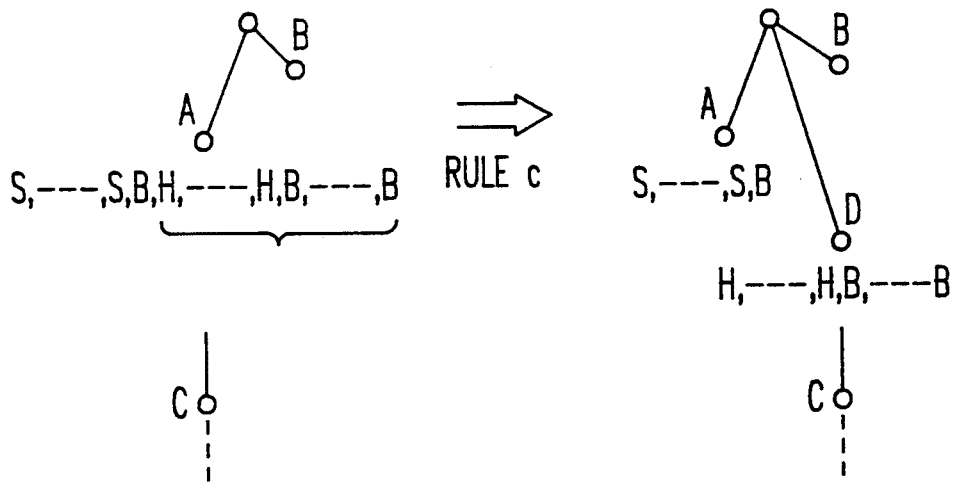

Rule c (refer to FIG. 7) If a node (A) contains a head block and it is not the first element of the node, then there is generated a younger sister node (D) and and there is the removal of the head-body sequence that begins with head block and ends with the last element of the node (A), with daughter 5 of the node (A), if any, and they are attached to the younger sister node (D). FIG. 7 illustrates the conversion process by this rule. When a node includes more than one head-body sequence, a new sister node is generated for each head-body sequence by recursive applications of this rule. This rule is mainly for the extraction of chapters or sections headed by a sub-title.

Figure 8:
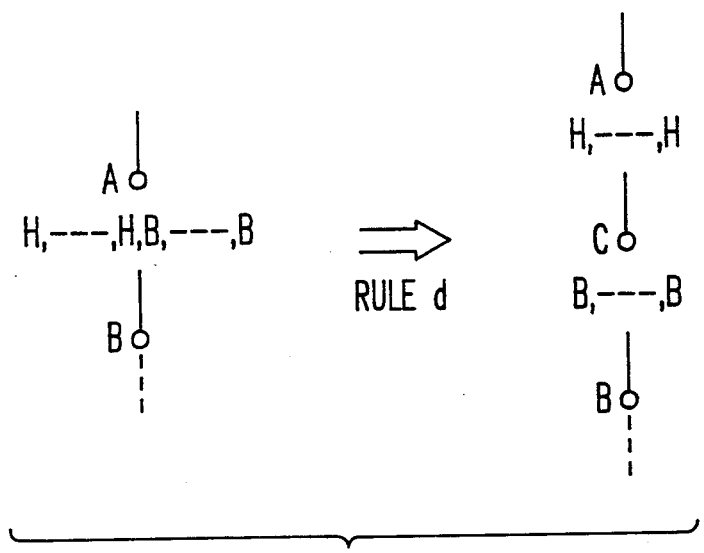

Rule d (refer to FIG. 8)

If there is a head block in a node and it is the first element in the node, then there is generated a daughter node and move the body sequence that follows the head sequence to the daughter node. This rule should be applied after the rules a, b and c have been completed. FIG. 8 shows that the body sequence is separated from node (A) and moved to a new node (C), which is the daughter of node (A), because node (A) has a single head sequence and a single body sequence. By this rule, a unique class is attached to each node.

This is the rule d which causes one node to represent another specified relationship.

Figure 9:
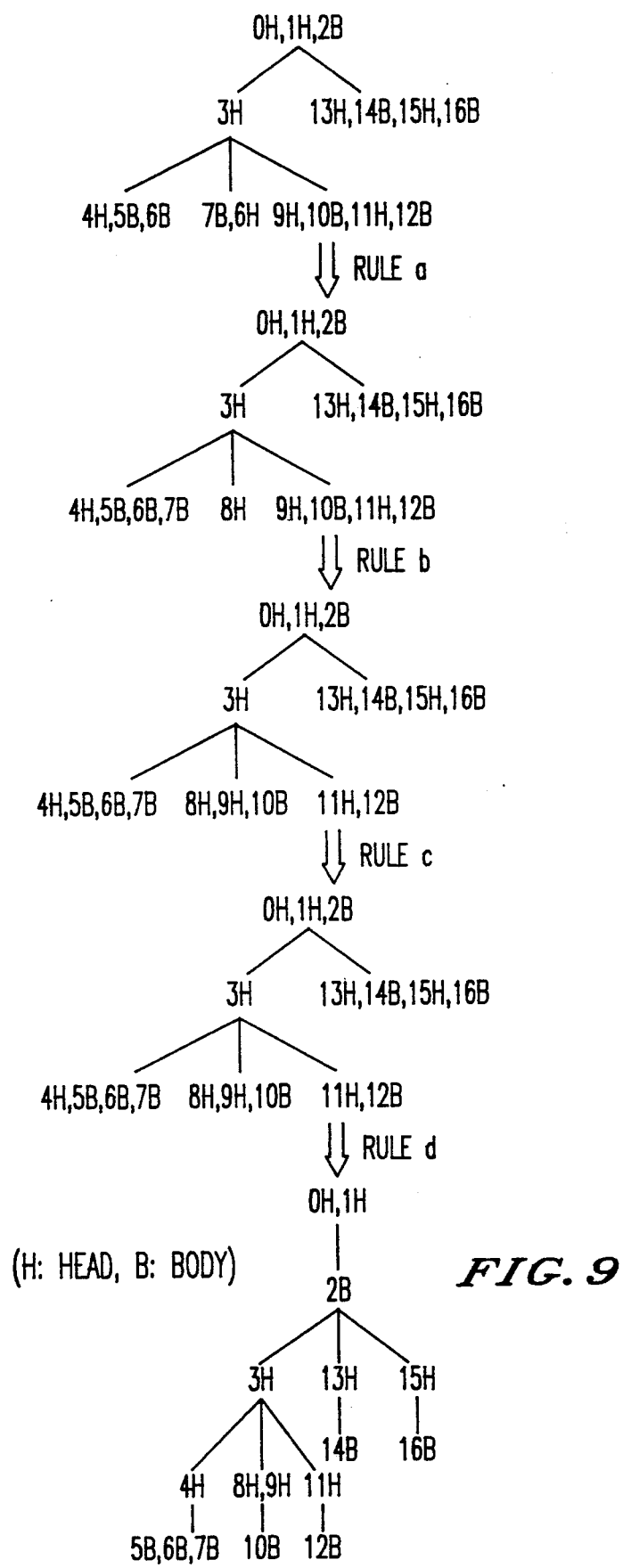
FIG. 9 is a diagram illustrating the operation results of one embodiment according to the present invention.

FIG. 9 shows an example of the transformation from the geometric structure of FIG. 2b into the logical structure of FIG. 4b by use of a combination of the above-described four rules a through d.

In the description of the four rules a through d, S, the sub-block, can include a larger amount of information. Further, H, the head sub-block, which is a root node, can represent a title or an author's name. The head sub-blocks within the nodes other than the root node can represent a subtitle. Moreover, B, the body sub-block within a terminal node can represent a paragraph. The body sub-blocks within the nodes other than the terminal node can represent an abstract or the like.

Figure 10A:
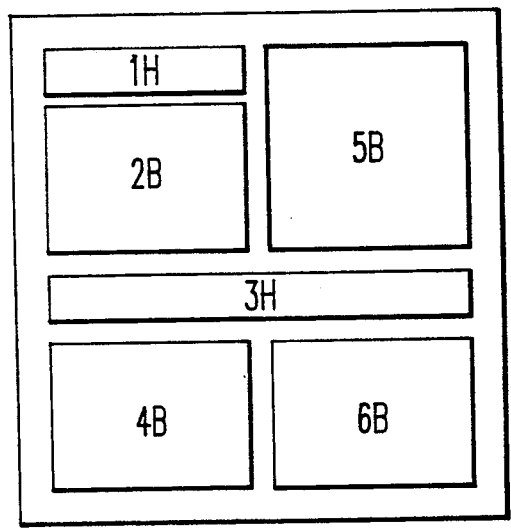
FIGS. 10a and 10b are diagrams illustrating the operations of one embodiment according to the present invention.
Figure 10B:
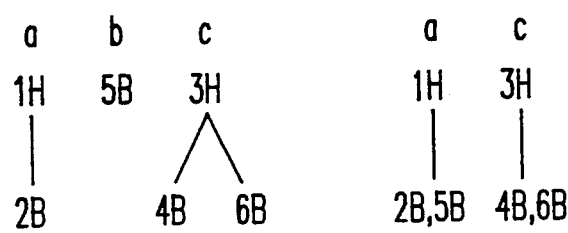

The above-described processes are performed with respect to a single geometric structure. However, a document including a large number of texts can also be represented by increasing the number of trees. In this case, the reading order of these trees is determined on the basis of the principle that the reading is not moved back to top of the preceeding left column. For example, as shown in FIGS. 10a and 10b, plural trees are used to represent a document including plural texts. FIG. 10a shows a document including plural sub-blocks. FIG. 10b shows geometric structures represented by three trees a, b and c.

The geometric structures are transformed into the logical structures as follows. Specifically, the tree a is produced corresponding to the sub-blocks 1H and 2B. The tree b is produced corresponding to the sub-block 5B, and the tree c is produced corresponding to the sub-blocks 3H, 4B and 6B. The tree a, tree b and tree c are arranged in alphabetical order. Here, the tree a having a root node which is a "head" can independently represent one text region. However, the tree b without the root node of a "head" (only a "body" is present) and it cannot independently represent one text region. Thus the tree b is added to the tree a, which is the next tree previous to the tree b. As a result, the tree a represents one text region, and the tree c represents another text region as shown in FIG. 10b.

As described above, the logical structures are produced by processes performed in the structure understanding unit 3. As a result, plural trees with respect to the sub-blocks are determined corresponding to the respective text regions. In this case, the respective sub-blocks have been previously designated by such items as a title, a subtitle, a paragraph and the like. Thus, all the sub-blocks of the respective text regions are not required to be extracted, but only the titles or the titles with subtitles are required.

Next, techniques of displaying the results extracted from the respective texts will be described. Frames that surround the sub-blocks of the same text region are displayed with the same color, but different colors from those of other text regions. Moreover, the entire area of the sub-blocks of the same text region may also be displayed with the same color. As a result, the relationship between the respective sub-blocks can be clearly represented. In another display technique, several sub-blocks such as subtitle sub-blocks and their paragraph sub-blocks are compiled, and represented by use of the same color. Moreover, the sub-blocks may also be distinguished from each other by differences in brightness, by distinctions between solid- and dotted-lines, or by blinking or flashing characters on background. In addition, all of the sub-blocks of the respective texts may be surrounded with frames.

The corresponding text numbers may be added to the left shoulders of the respective frames. If the image sub-blocks, such as graphs and photographs, can be distinguished from the sentence sub-blocks by the processes performed in the structure analyzing unit 1, these sub-blocks may also be discriminated in the above-described manner. In this case, image sub-blocks may also be displayed using images in original form. In the above description, the respective sub-blocks are displayed in the complete form. However, the respective sub-blocks may also be represented by the use of constituent components, such as characters per se, frames that surround the characters, or the center lines representing the character rows. Moreover, the respective sub-blocks may also be represented by use of the base lines, the character patterns per se or the frames that surround the character patterns. In this case, the above-described multi-color discrimination technique may also be practiced.

Next, techniques of designating the extracted texts will be described. Here, texts to which the respective sub-blocks belong have already been clarified. Further, the logical relationship between the respective sub-blocks has already been recognized. Thus, a sub-block, which includes or exists nearest to a position designated by a mouse or the like, may also be extracted. In addition, a sub-block having a logical dominating relationship with such a position designated by a mouse or the like, may also be extracted. Moreover, a text including such a position designated by a mouse or the like may also be extracted. Therefore, the character recognition of the texts may be achieved on the basis of the thus extracted results. Further, the image by itself or the image in the form of binary values or the image formed by use of a dither technique may also be output. The above-described designation may be easily performed because the respective texts are clearly distinguished from each other by different colors.

As described above, according to the present invention, the meaning and connection relationship between the sub-blocks can be determined by use of physical properties (features) of the document alone without investigating the context of the sub-blocks.

Moreover, in accordance with the present invention, there can be provided a document image processing apparatus capable of automatically extracting specified text regions from a document including a large number of text regions without the need for additional human intervention. Further, the apparatus can also extract only the title from the respective text regions.

Obviously, numerous additional modifications and variations of the present invention are possible in light of the above teachings. It is therefore to be understood that within the scope of the appended claims, the invention may be practiced otherwise than as specifically described herein.

What is claimed is:

1. A document image processing apparatus comprising:
    means for analytically dividing the image of a document into sub-blocks having analogous physical properties;
    means for providing each of said sub-blocks with a position indicating code, each code having a prescribed priority and a discriminating code corresponding to a predetermined category of said sub-block;
    tree means for grouping any of the position indicating codes of said sub-blocks having the same prescribed priority, the tree means including means for separating the groups of codes into first node groups wherein multiple groups of indicating codes have the next priority in the prescribed priority order, and second node groups wherein only a single group of indicating codes has the next priority in the prescribed priority order; and
    means for representing the position indicating codes of said sub-blocks on the same level at the separate nodes on the same level of the tree, said position indicating codes being selected from the position indicating codes of the sub-blocks represented at the nodes of the tree, and representing the position indicating codes of the sub-blocks being controlled by said sub-blocks at the nodes in the lower portion of the tree.

2. The apparatus of claim 1, wherein said means for dividing the image of a document into sub-blocks includes run length coding means, column information extracting means, line information extracting means, and item adding means.

3. The apparatus of claim 1, wherein said means for grouping the position indicating codes of said sub-blocks includes means for extracting information adjacent to each other in the same column, and tree structure forming means.

4. The apparatus of claim 1, wherein said means for representing the position indicating codes of said sub-blocks includes means for transforming geometric structures into logical structures by use of rules of extracting priority order information, multiple texts processing means and item adding means.

5. A document image processing apparatus which has means for inputting an image of a document comprising:
    structure analyzing means for analytically dividing the image of said inputted document into sub-blocks, including run length coding means for coding the image of said inputted document, column information extracting means for extracting information as to the column structure of said image of said document, line information extracting means for extracting information as to the line pattern of said image of said document, sub-block information extracting means for detecting sub-blocks in said image and item adding means for adding items;
    geometric structure forming means for forming a representation form corresponding to the physical positional relationship between said sub-blocks and which is coupled to said structure analyzing means; and
    structure understanding means for transforming said representation form into a modified document image having a predetermined relationship between said sub-blocks.

6. A document image processing apparatus which has a means for inputting an image of a document comprising:
    structure analyzing means for analytically dividing the inputted image of a document into sub-blocks;
    geometric structure forming means coupled to said structure analyzing means for forming a representation form corresponding to the physical positional relationship between said analytically divided sub-blocks;
    structure understanding means coupled to said geometric structure forming means for transforming said representation form into a modified document image having a predetermined relationship between said sub-blocks, including means for transforming geometric structure into logical structure by use of rules of extracting priority order information and multiple text processing means for processing multiple text portions of said image and item adding means for adding items to said divided sub-blocks.

* * * * *